Feb. 26, 1929. J. BECKER Re. 17,224
COKING RETORT OVEN
Original Filed Aug. 5, 1921 7 Sheets-Sheet 1
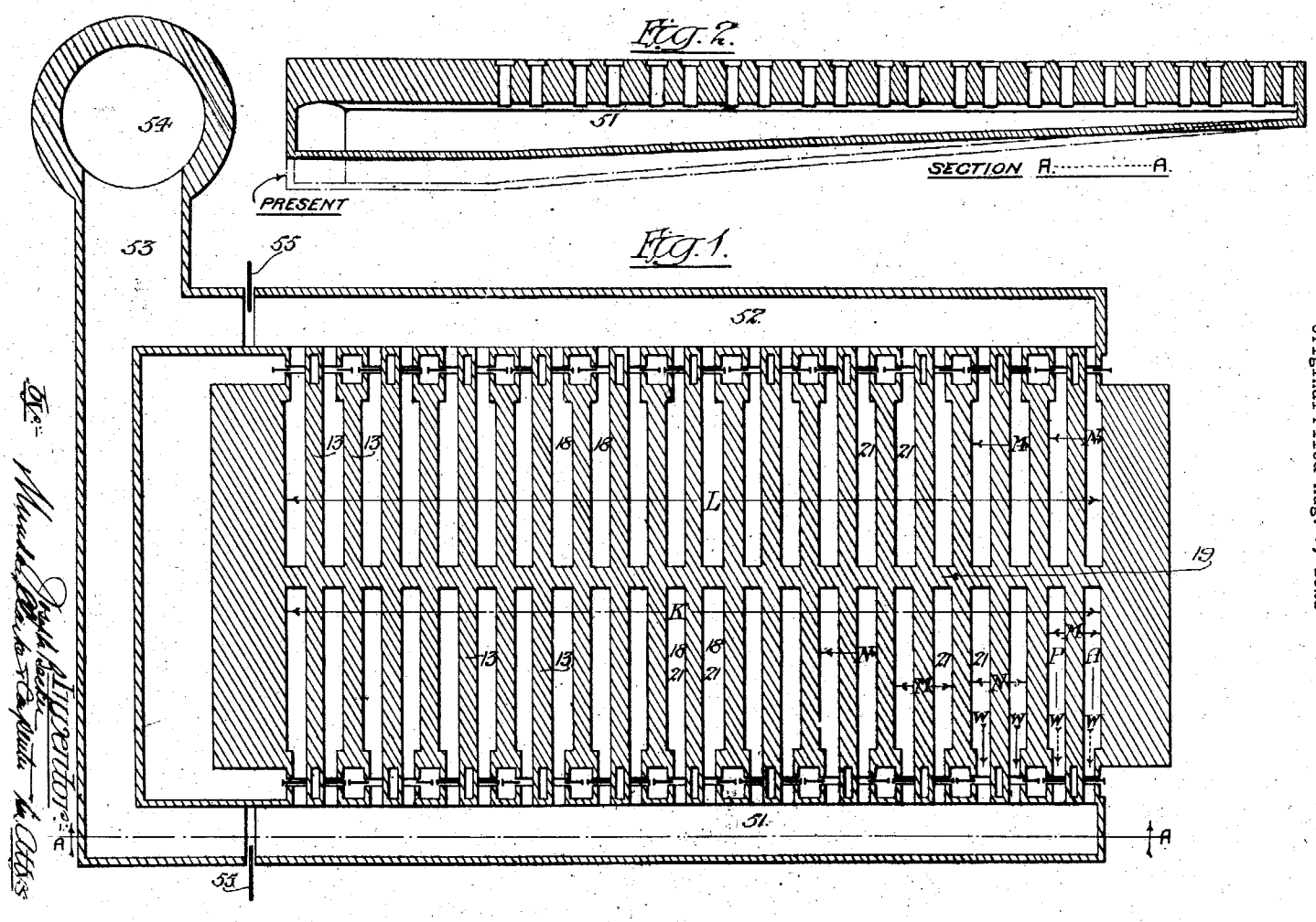

Feb. 26, 1929. J. BECKER Re. 17,224

COKING RETORT OVEN

Original Filed Aug. 5, 1921 7 Sheets-Sheet 2

Inventor:-
Joseph Becker,
By:- Munday, Evarts & Clayton
His Attys.

Feb. 26, 1929. J. BECKER Re. 17,224

COKING RETORT OVEN

Original Filed Aug. 5, 1921 7 Sheets-Sheet 3

Inventor:-
Joseph Becker,
By:- Munday, Clarke & Carpenter
Attys

Feb. 26, 1929. J. BECKER Re. 17,224

COKING RETORT OVEN

Original Filed Aug. 5, 1921 7 Sheets-Sheet 4

Inventor:-
Joseph Becker,
By:- Munday Clarke & Carpenter
his Attys:-

Feb. 26, 1929. J. BECKER Re. 17,224

COKING RETORT OVEN

Original Filed Aug. 5, 1921 7 Sheets-Sheet 5

Inventor:-
Joseph Becker,
By: Munday, Clarke & Carpenter
Attys.

Feb. 26, 1929. J. BECKER Re. 17,224

COKING RETORT OVEN

Original Filed Aug. 5, 1921 7 Sheets-Sheet 6

Inv.: Joseph Becker
By: McCaleb, Clarke & Carpenter, his Attys.

Feb. 26, 1929. J. BECKER Re. 17,224

COKING RETORT OVEN

Original Filed Aug. 5, 1921 7 Sheets-Sheet 7

Inventor:
Joseph Becker,
By: Munday, Evarts & Carpenter, his Attys.

Reissued Feb. 26, 1929. Re. 17,224

UNITED STATES PATENT OFFICE.

JOSEPH BECKER, OF PITTSBURGH, PENNSYLVANIA, ASSIGNOR, BY MESNE ASSIGNMENTS, TO THE KOPPERS COMPANY, A CORPORATION OF DELAWARE.

COKING-RETORT OVEN.

Original No. 1,556,749, dated October 13, 1925, Serial No. 490,035, filed August 5, 1921. Application for reissue filed October 19, 1926. Serial No. 142,788.

This invention comprehends improvements of general utility in the coking retort oven art; and also comprehends certain improvements especially applicable to coking retort ovens of the well-known cross-regenerative type exemplified in the patent to H. Koppers No. 818,033, dated April 17, 1906.

The invention has for objects the provision of a coking retort oven having as important characteristics: a novel system of flow through the regenerators and through the flues, that permits a considerable reduction in the dimensions of the waste gas tunnels which receive the waste gases from the outflow operating regenerators, inasmuch as the invention provides for the concurrent active employment of the waste gas tunnels on both sides of an oven battery, with the result that each waste gas tunnel need communicate with only half the total number of outflow operating regenerators, with a greatly decreased volume of flow through each tunnel. The improved construction of the invention is furthermore of great importance in oven batteries fired with extraneously-derived gas, such as producer gas, as the employment of such gas results in increased volume of combustion products and adequate flue spaces for the waste gases must be provided to feed to the stack this increased volume of combustion products. By the invention, the waste gas tunnel construction may be adequately accommodated to such increased volume of combustion products, and yet each waste gas tunnel may be made approximately one-half the size of that employed in present practice. The improvements of the invention are furthermore applicable to oven batteries of standard design, and may be incorporated in such batteries, without resorting to any necessity for rebuilding the battery structure.

In addition to the general objects recited above, the invention has for further objects such other improvements or advantages in construction and operation as are found to obtain in the structures and devices hereinafter described or claimed.

In the accompanying drawings, forming a part of this specification, and showing for purposes of exemplification, a preferred form and manner in which the invention may be embodied and practiced, but without limiting the claimed invention specifically to such illustrative instance or instances:

Figure 1 is a horizontal sectional view through the regenerator and waste gas tunnel construction of a coke oven battery embodying features above specified and equipped with the improvements of the present invention;

Fig. 2 is a vertical section taken longitudinally of one of the waste gas tunnels in a plane indicated by the line A—A of Fig. 1;

Figure 8:
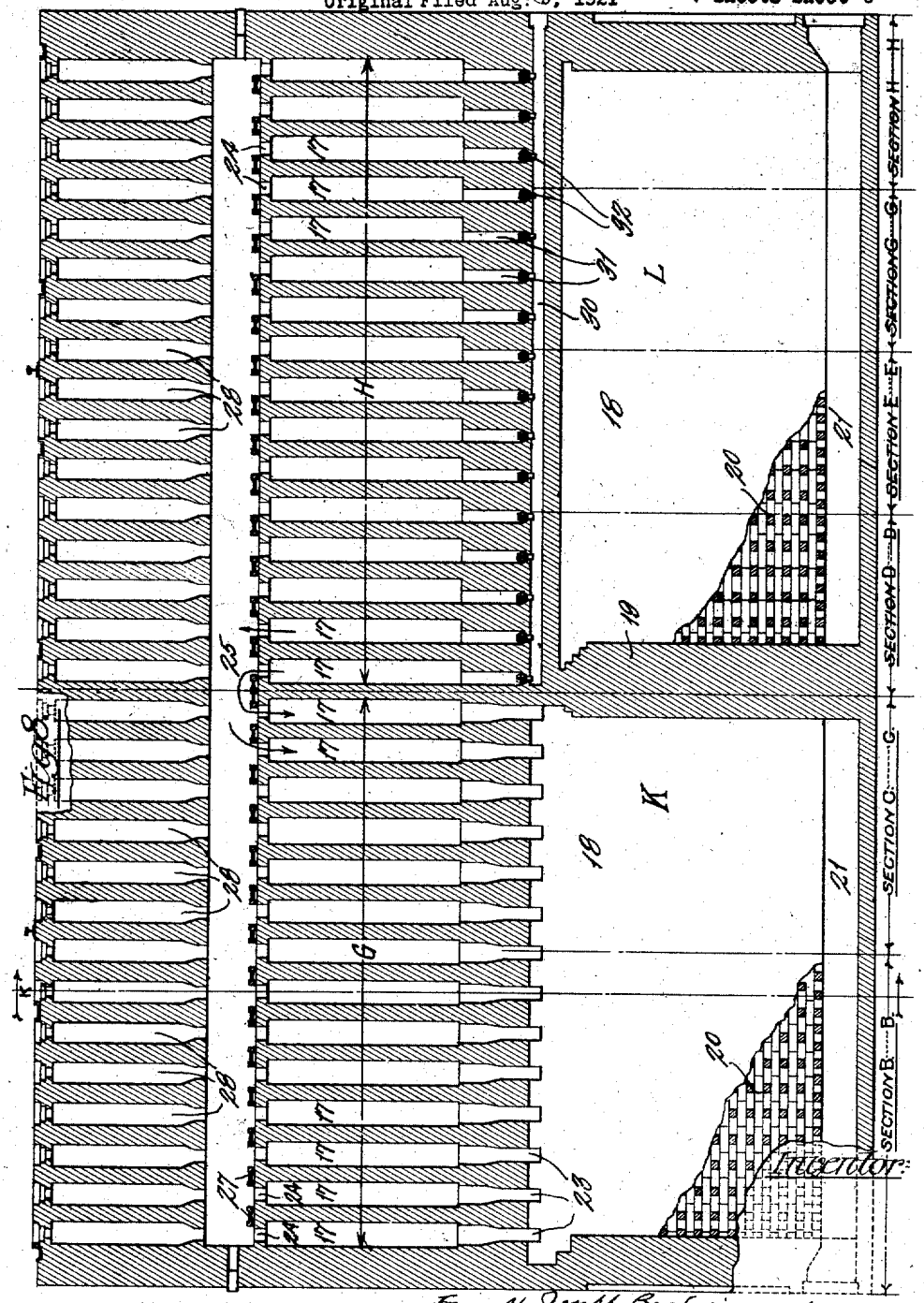
Figure 9:
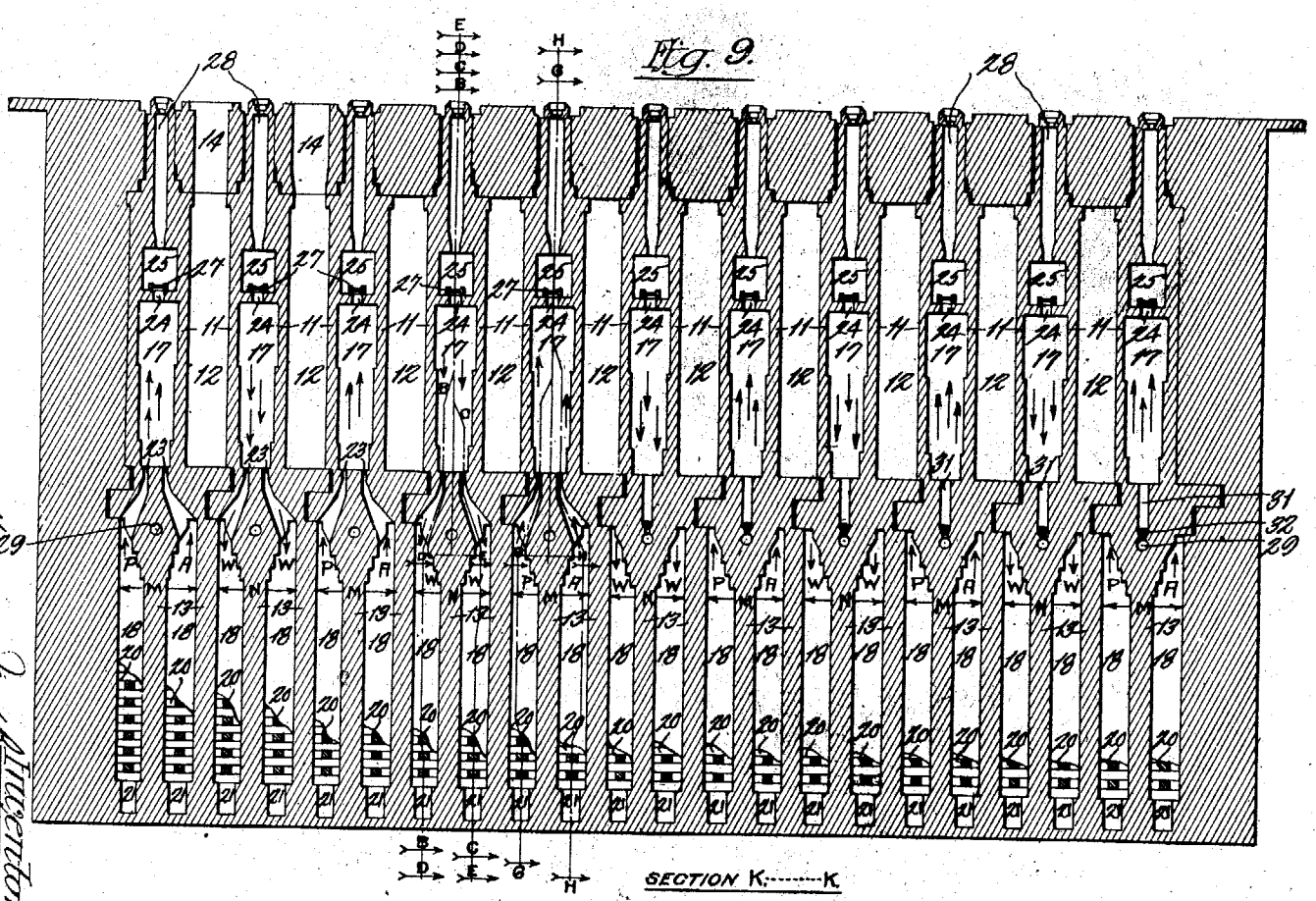

Fig. 8 is a crosswise vertical sectional elevation through a coke oven battery embodying features above specified, the view being taken longitudinally through a heating wall and a pair of regenerators, in planes indicated by the lines B—B, C—C, D—D, E—E, G—G, and H—H of Fig. 9; and Fig. 9 is a composite vertical sectional elevation taken longitudinally of the coke oven battery, in planes indicated by the lines K—K of Fig. 8.

The same characters of reference indicate the same parts in each of the several views of the drawings.

In the embodiment illustrated in the drawings, the invention is incorporated in a combination coke oven battery, i. e., a battery having provision for being operated either with producer gas as the fuel, or with the coke oven gas derived from the distillation of the coal in the coking chambers or retorts of the battery. For convenience, the present description will be confined to the present illustrated embodiment of the invention in such a combination coke oven battery; the novel features and improvements made by the invention, are susceptible of other applications, such for example, as ordinary so-called "coke ovens" employing coke oven gas as the fuel, or ordinary so-called "gas ovens" employing producer gas as the fuel; hence, the scope of the invention is not confined to the specific use and specific embodiment herein described as an illustrative example.

Referring to the drawings: There are illustrated views of a coke oven battery or plant of the by-product type, having features above specified; said oven battery embodies in its construction a plurality of crosswise elongated heating walls 11, 11, and a plurality of intermediate crosswise elongated coking chambers 12, 12; the heating walls form the side walls of the respective coking chambers 12, as shown more particularly in Fig. 9, and, in the present instance, are supported, together with the coking chambers, by the heavy supporting or pillar walls 13, 13, which extend crosswise of the battery and are located, as shown in Fig. 9, beneath the superstructure of the battery. These pillar walls, collectively form the main support for the entire superstructure of the oven battery, and are themselves supported upon a flat mat or platform which constitutes the subfoundation upon which the entire battery rests. The coal to be coked is charged into the several coking chambers or ovens through charging holes 14, located in the top 15 of the oven battery and positioned directly above the ovens or chambers 12, as shown in Fig. 9. These charging holes 14 are equipped with the usual removable covers which are removed during the charging of the individual ovens or coking chambers and are placed in position to close the tops of such coking chambers during the entire coking or distilling operation. The gases of distillation pass from the tops of the several coking chambers 12 through the usual gas outlets, and thence through ascension pipes (not shown) into the usual gas collecting main which carries the distillation products to the by-product recovery apparatus.

Heat for coking the charges of coal in the several ovens or chambers 12 is derived from the heating walls 11, which, as above mentioned, extend crosswise of the battery at the sides of the coking chambers. Referring more particularly to Figs. 8 and 9, each heating wall 11 is constituted of a plurality of flame or combustion flues 17. The flame flues of each heating wall are, in accordance with the present embodiment of the invention, operatively disposed into two groups, G and H, all of the flues of the several groups G operating for flow concurrently in one direction, while all of the flues of the several groups H operate concurrently for flow in the opposite direction. That is to say, when the flame flues of the several groups G are operating for inflow or burning, the flame flues of the several groups H are operating for outflow to convey to the outflow operating regenerators the waste gases from the burning flues. On reversal of the battery, the inflow operating flues, such as the flues of the several groups G, become outflow operating flues, and the outflow operating flues, such as the flues of the several groups H, become inflow operating flues.

The crosswise regenerators 18 of the retort oven or battery are located at a lower level than the aforesaid heating walls 11 and coking chambers 12 and, in the present instance, extend in parallelism between the pillar walls 13. Located in the middle lengthwise vertical plane of the coke oven battery, is a vertical partition 19, as shown in Figs. 1 and 8, which partition extends all the way up from the mat of the battery to the bottom of the overlying coking chambers and from one to the other of the pillar walls 13. The regenerators which are respectively located on opposite sides of the battery, extend inwardly to said partition 19 and are separated thereby, as clearly shown in Figs. 1 and 9. This arrangement permits control from opposite sides of the battery of the flow through the regenerators and the flues. Each regenerator 18 is a chamber containing open brick work, commonly called checker work, and indicated at 20 with a distributing sole channel 21 underneath such checker work, the channels 21 forming the soles of such chambers and opening up into the checker work. The several regenerators are heated in alternation, by the hot combustion products that draw off from the flame or combustion flues hereinbefore mentioned and then impart such heat to the medium that they feed into these flame flues.

According to the invention, the series K and L of regenerators that are respectively located on opposite sides of the battery, as shown in Fig. 1, are operatively disposed in two groups M and N. Each group M or N comprises a pair of adjacently disposed regenerators, and in both series K and L the pairs of regenerators constituting the groups M alternate with the pairs of regenerators constituting the groups N. All of the regenerators of the several groups M operate concurrently for flow in the same direction, while all the regenerators of the several groups N are operating concurrently for flow in the opposite direction. When the battery is burning producer gas or other extraneously derived gas as the fuel in the burning flame flues, the several inflow operating regenerators, such as the regenerators of the groups M of both series K and L, each comprise gas regenerators P and air regenerators A, while concurrently all the regenerators of the several groups N are operating as waste gas regenerators W. On reversal, the groups of regenerators N that heretofore operated as waste gas regenerators become gas and air regenerators and the groups of regenerators M concurrently become waste gas generators. According to the system of flow through the regenerators, waste gas regenerators alternate with inflow operating regenerators on each side of the battery, the inflow operating regenerators on one side being aligned with the waste gas regenerators on the other. Consequently waste gas is discharged from regenerators concurrently on both sides of the battery, instead of entirely on one side and then entirely on the other, after a subsequent reversal, as has heretofore been a common practice in this art.

The regenerators of each group M and N are provided with series of ducts 23, all of which lead respectively to individual flame flues 17 of the same heating wall. With this construction, each flame flue 17 communicates by a pair of ducts 23 with adjacent separate regenerators of a group M or N, through which adjacent separate regenerators flow is maintained concurrently in the same direction. Each flame flue 17 of each heating wall has at its top a port or opening 24, for draft and the passage of combustion products or waste gas from the flame within the flue. These ports 24 open up into horizontal or bus flues 25 formed in the heating walls 11, and connecting all of the flame flues of the groups G with the flame flues of the groups H of the same heating wall. Inasmuch as, according to the present embodiment of the invention, the inflow operating flues of each heating wall are on one side of the battery and the outflow flues of the same heating wall are on the other side of the battery, the reversal of flow through the flues takes place crosswise of the battery, in accordance with the usual Koppers practice. However, during the period between each reversal outflow is maintained in the flues of alternate heating walls on each side of the battery, while inflow is maintained in the other groups of flues on each side of the battery.

The draft through the ports 24 may be regulated by means of usual movable dampers or sliding bricks 27, positioned in the ordinary way in the bottoms of the horizontal flues 25 and adapted to be reached by access flues 28 which extend from the top of the horizontal flues in the several heating walls to the top 15 of the battery, there being an access flue positioned over each flame or combustion flue of each heating wall.

Extending crosswise of the battery in the pillar walls 13 and located beneath the heating wall 11 thereabove, are pairs of gas supply channels 29 and 30. These channels 29 and 30 are for the purpose of supplying coke oven gas to the several flame flues on each side of the center partition 19, and to accomplish this end, the channels 29 communicate with the individual flues 17 by means of ducts 31 that lead from such channels 29 individually into the bottoms of individual flues; and the channels 30 also communicate with the bottoms of individual flues by means of similarly connected ducts. Within the several ducts are disposed the usual nozzles 32. The supply of coke oven gas to the respective channels 29 and 30 is derived from coke oven gas means of usual type and respectively located on the opposite sides of the battery and extending longitudinally therealong. Suitable means is provided for admitting or cutting off the supply of gas with respect to the channels 29 and 30, it being understood that the gas supply is either concurrently maintained or concurrently shut off from the channels 29 or 30.

Figure 3:
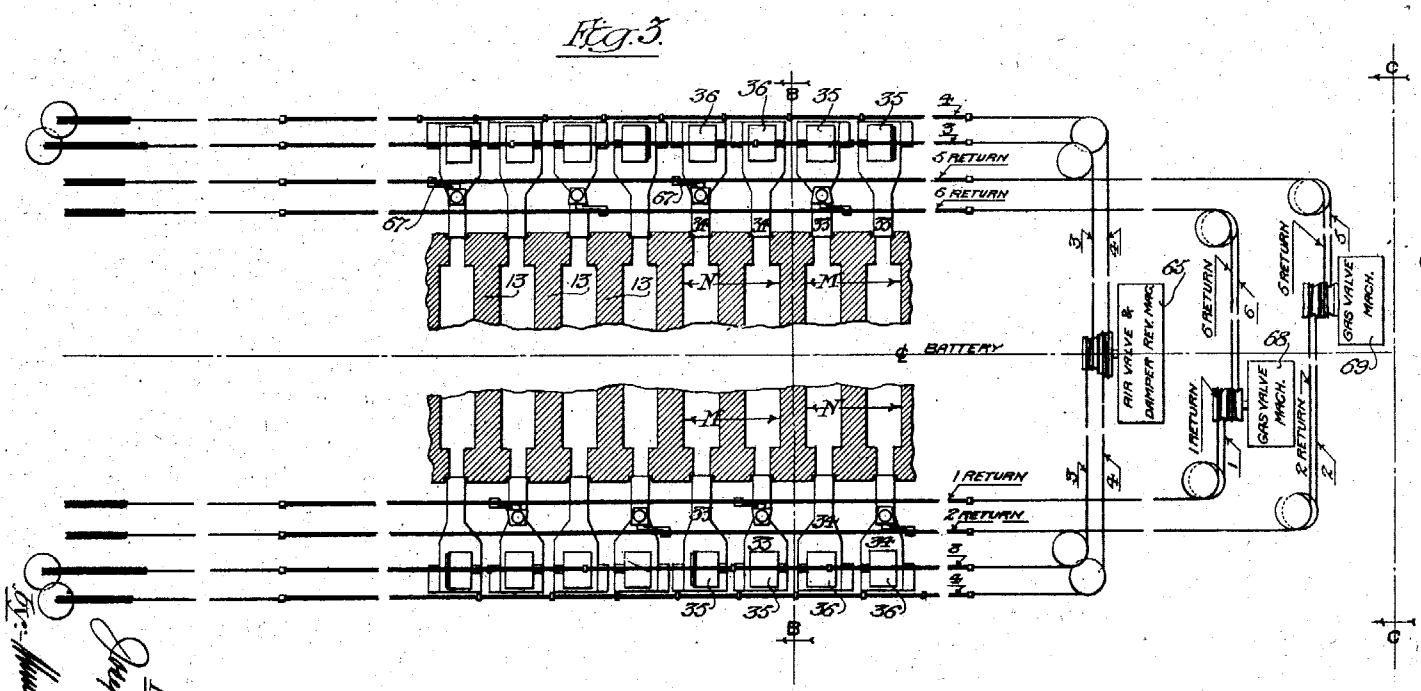
Fig. 3 is another horizontal section through the regenerators of the coke oven battery, showing in plan the various connections and devices for reversing the flow through the regenerators and through the flues.

Referring now more particularly to Figs. 1 and 3, the sole channels 21 of the groups of regenerators M, of both series K and L of regenerators, respectively communicate with flow boxes 33; similarly the sole channels 21 of the regenerators of the several groups N on both sides of the battery respectively communicate with flow boxes 34. This results in the arrangement of two series of flow boxes 33 and 34 along both sides of the battery, the flow boxes of each series being disposed into pairs, which pairs alternate with pairs of flow boxes of the other series.

The several flow boxes of the series 33 are provided with lids 35 for opening and closing the interior of the respective flow boxes to the outer air, and the several flow boxes of the series 34 are respectively provided with similar lids 36. Each air box lid 35 may be provided with a lid-operating lever 37 and each air box lid 36 may be provided with a similar lid-operating lever 38.

Extending along each side of the battery is a producer gas main 46 leading from a suitable source of supply of producer gas and adapted to be opened up to or shut off from its source of supply by means of any improved control valve. The valve that controls the supply to the producer gas main 46 is not herein illustrated for the reason that the specific construction of such valve is immaterial to the present invention. Leading from the producer gas main on either side of the battery into one flow box of each pair 33 and into one flow box of each pair 34 are branch producer gas supply pipes 47 and 48 respectively provided with control valves 49, 50, it being understood that all of the control valves of the series 49 are open, while all of the control valves of the series 50 are closed, or vice versa.

In accordance with the invention, two waste gas tunnels or stack flues 51 and 52 extend longitudinally of the battery, one on one side of the battery and the other on the other side, and merge at their discharge ends into a single tunnel 53 which leads to a stack 54. Within each of the tunnels 51 and 52 is a valve 55 permitting each tunnel to be opened up to or shut off from communication with the stack 54, as desired. The valves 55 may be adjusted in the manner of dampers to control the flow through the respective stack flues 51, 52 in which such valves are located. Each flow box 33 or 34 on one side of the battery is provided with a port 56 that leads to a channel 57 which opens up into the aforesaid waste gas main 51; similarly each flow box 33 or 34 on the opposite side of the battery is provided with a port 58 leading to a channel 59 which communicates with the waste gas tunnel 52. With this construction the waste gas tunnel 51 is connected by channels 57 with the several air boxes that control the exhaust from outflow operating regenerators on one side of the battery, and the waste gas tunnel 52 is independently connected by a further series of channels with the flow boxes that control the exhaust from the outflow operating regenerators on the other side of the battery. As outflow is maintained concurrently in some of the regenerators on each side of the battery, both of the waste gas tunnels 51 and 52 operate concurrently to convey the waste gases from the battery to the stack and, inasmuch as the volume of outflow is distributed between two tunnels, instead of one, each waste gas tunnel need be only approximately one-half the usual size, adequately to perform its function. This is an important advantage in by-product coke oven construction, as it effects a great saving in the structural work required to construct these stack flues or waste gas tunnels.

The several flow boxes of both groups 33 and 34 on one side of the battery are each provided with mushroom valves 60 for opening and closing the ports 56 with respect to the channels 57 leading to the waste gas tunnel 51; similarly the several flow boxes of the groups 33 and 34 on the other side of the battery are provided with mushroom valves 61 for opening and closing the ports 58 with respect to the channels 59 that lead to the waste gas tunnel 52. The mushroom valves 60 are operated by valve operating levers 62 and the mushroom valves 61 are operated by valve operating levers 63. All of the valve operating levers of the series 62 and 63 are controlled or operated by a single cable 4 which leads to the air valve and damper reversing machine 65. On one operation of the said machine 65, the mushroom valves of the flow boxes of the groups 34 on both sides of the battery are opened to establish communication between such flow boxes and the waste gas tunnels 51 and 52, while concurrently the mushroom valves of the other groups of flow boxes 33 are closed to cut off such flow boxes from communication with the waste gas tunnels; on reverse operation of the machine 65, the mushroom valves of the groups of flow boxes 33 are opened, while the mushroom valves of the groups of flow boxes 34 are closed, to establish communication between the flow boxes 33 and the exhaust tunnels and concurrently to shut off the flow boxes 34 from communication with said exhaust tunnels.

According to the illustrated embodiment of the invention, only one flow box of each group 33 is provided with a lid operating lever 37; similarly only one flow box of each group 34 is provided with a lid operating lever 38. The producer gas supply pipes 47 and 48 respectively lead to the other flow boxes of the groups 33 and 34. All of the lid operating levers 37 and 38 of both groups 33 and 34 of flow boxes on both sides of the battery are controlled and operated by the reversing cable 3 which leads to the aforesaid reversing machine 65. One operation of said reversing machine 65 is effective to open the lids 35 of the flow boxes of the groups 33 which function for air intake, while concurrently the lids 36 of the flow boxes 34 remain closed; reverse operation of the said reversing machine is effective to open the flow box lids 36 of the groups 34 which function for air intake, and to close the flow box lids 35 of the groups 33.

Figure 4:
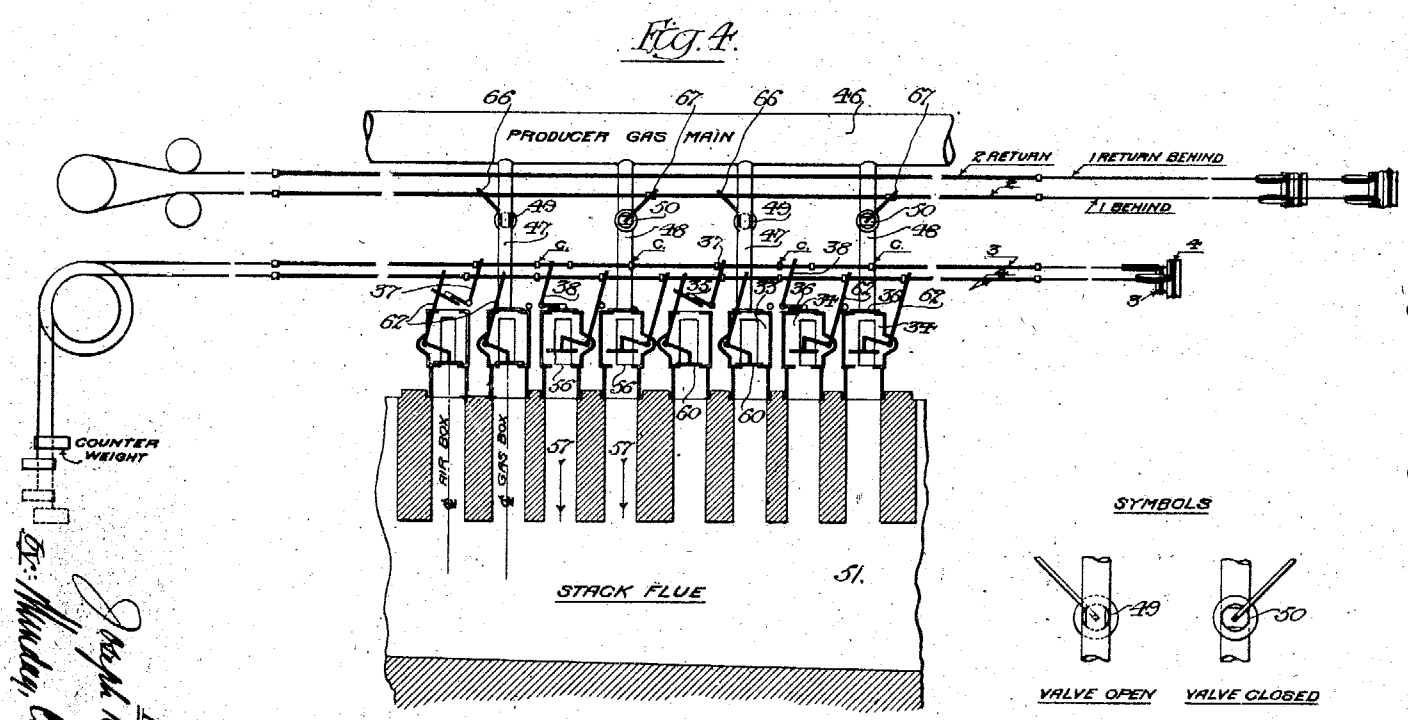
Fig. 4 is a vertical section, taken longitudinally of the battery through the air boxes and the waste gas tunnel or stack flue, and showing the reversing connections on one side of the battery.
Figure 5:
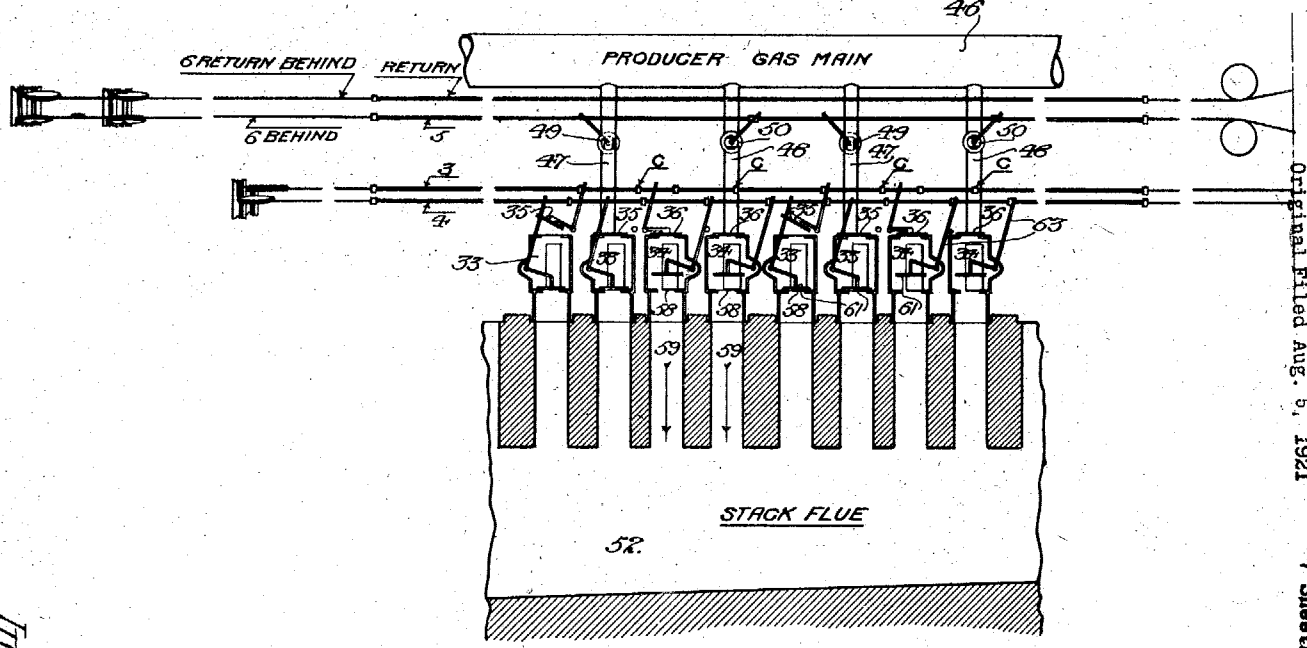
Fig. 5 is a view similar to Fig. 4 but showing the reversing connections on the other side of the battery.
Figure 6:
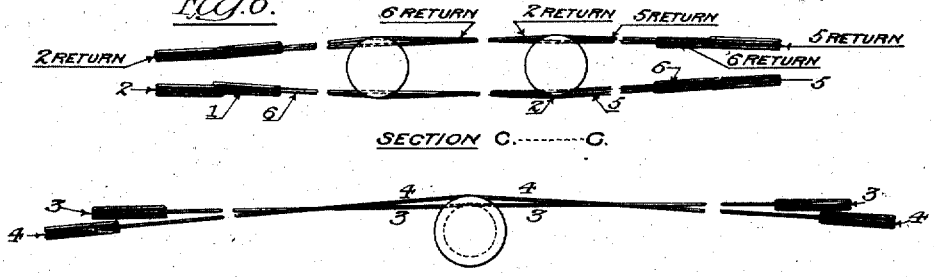
Fig. 6 is an end view of the reversing connections, taken in a plane indicated by the line C—C of Fig. 3.
Figure 7:
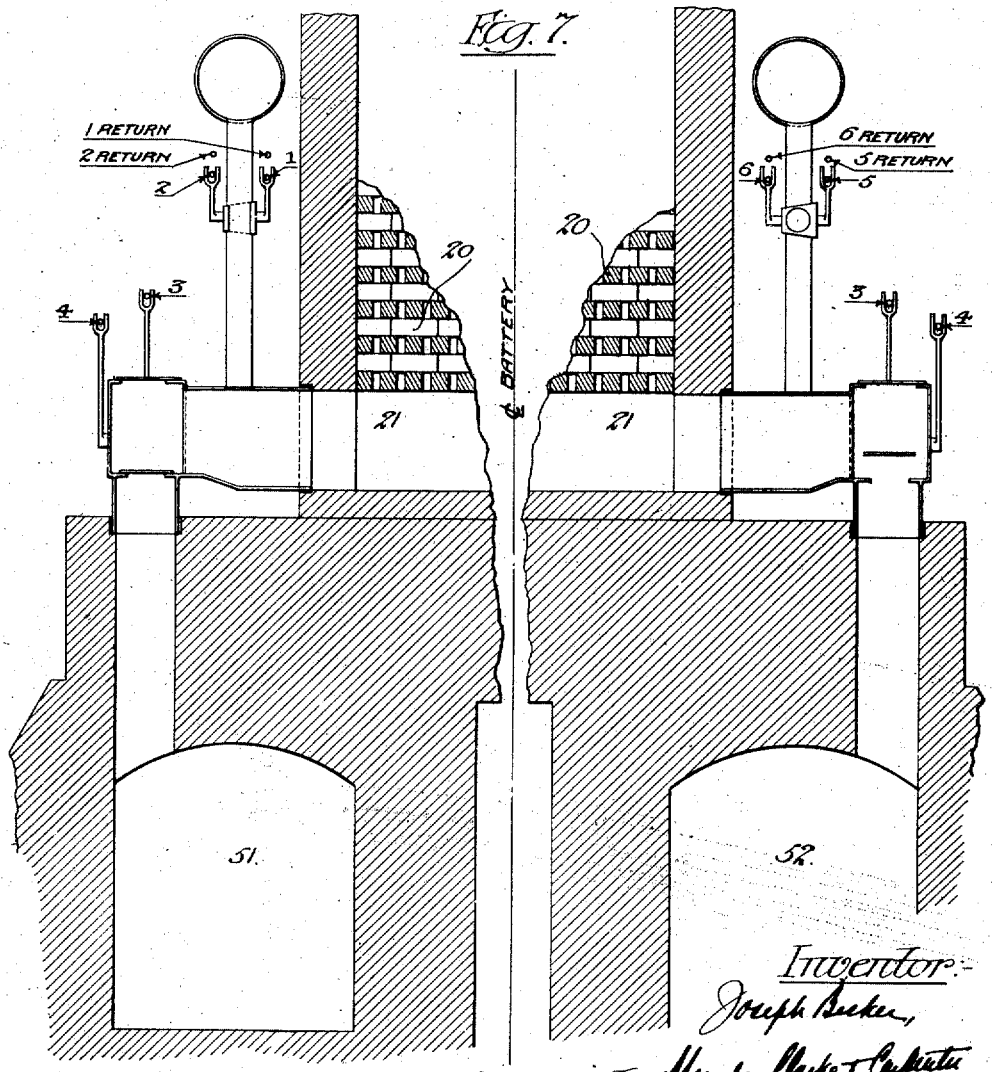
Fig. 7 is an enlarged transverse vertical sectional elevation taken in a plane indicated by the line B—B of Fig. 3.

The fuel gas valves 49 in the gas supply pipes 47 leading to the gas intake flow boxes of the groups 33 on both sides of the battery are provided with operating levers 66; similarly the fuel gas controlling valves 50 in the supply pipes 48 leading to the gas intake flow boxes of the groups 34 are provided with operating levers 67. The series of operating levers 66 on both sides of the battery are controlled and operated by cables 1 and 6, leading to the gas valve machine 68; the series of valve operating levers 67 on both sides of the battery are controlled and operated by cables 2 and 5 leading to the gas valve machine 69. The operation of the gas valve machines 68 and 69 is effective to open either the entire series of valves 49 and close the entire series of valves 50 or, on reversal, to open the entire series of valves 50 and close the entire series of valves 49. As indicated in Fig. 4 the valves 49 are in the open position and the valves 50 are in the closed position.

The operation of the battery, when using a special generator gas, such as ordinary producer gas, is illustrated in the accompanying drawings. Assuming that the several regenerators of the groups M on both sides of the battery are operating for inflow and the several regenerators of the groups N on both sides of the battery are operating concurrently for outflow, the several flues of the groups G are operating as burning flues, while downflow is maintained in the several flues of the groups H. When so operating, the mushroom valves of the groups of flow boxes 34 are open while the mushroom valves of the groups of flow boxes 33 are closed; the air box lid of one flow box of each group 33 is open and the gas valve 49 of the other flow box of each group 33 is also open; concurrently the lid 33 of one flow box of each group 34 is closed and the gas valve 50 of the other flow box of each group 34 is also closed. With the parts arranged in such relative positions, producer gas flows into the several inflow operating regenerators P of the groups M, while air flows into the several inflow operating regenerators A of the same groups. As both inflow regenerators P and A are connected with groups of inflow operating flues G of the heating walls, atmospheric air and producer gas flow into all of the inflow operating flues G and igniting burns upwardly in said flues. The waste gases from the upburning flues, comprising the groups G pass into the horizontal bus flues and flowing in alternate heating walls to the one side of the battery and in the other heating walls to the other side of the battery pass downwardly through the outflow regenerators N into the several flow boxes 34 and thence through the open mushroom valves into the waste gas tunnels 51 and 52 on both sides of the battery. On reversal, the several regenerators which heretofore operated for inflow become outflow regenerators and the inflow operating flues become outflow operating flues.

When operating the battery with coke oven gas as the fuel, the flow boxes of both groups 33 and 34 are cut off at all times from the producer gas mains 46. All of the flow boxes of both groups are provided with lid operating levers 37 and 38, so that on operation of the reversing mechanism, air flows into the open flow boxes of either group 33 or 34. The air reversing cable 3 is provided with additional operating connections *c* for effecting the operation of the lid operating levers 37 and 38 employed, when burning coke oven gas as the battery fuel. The flow through the battery takes place, during coke oven gas operation, in exactly the same manner as when employing producer gas, the only exception being that both inflow operating regenerators of each group M or N feed air to the flues instead of air and producer gas, the fuel gas supply being derived from the fuel gas channels 29 and 30. In coke oven gas operation, the waste gases pass in exactly the same manner to the waste gas tunnels 51 and 52.

The invention as hereinbefore set forth is embodied in a particular form of construction, but may be variously embodied within the scope of the claims hereinafter made.

I claim:

1. In a coke oven battery, in combination: a plurality of coking chambers; heating walls contiguous to such coking chambers and respectively constituted of vertical combustion flues operatively disposed into two groups of consecutive similarly-operable flues; reversible regenerators on both sides of the battery located below the coking chambers and the heating walls and parallel therewith, said regenerators being communicably connected with the flues and operatively disposed into inflow and outflow groups, the inflow groups alternating with the outflow groups on each side of the battery; a producer gas supply; reversing valve connections between said producer gas supply and one regenerator of each group on both sides of the battery; reversing air valve connections for the other regenerator of each group on both sides of the battery; waste gas tunnels located respectively on opposite sides of the battery; and valve connections for establishing communication concurrently between the outflow regenerators on each side of the battery respectively with the waste gas tunnels on the same sides of the battery as the regenerators; substantially as specified.

2. In a coke oven battery, in combination: a plurality of coking chambers; heating walls contiguous to such coking chambers and respectively constituted of vertical combustion flues operatively disposed into two groups of consecutive similarly-operable flues; regenerators on both sides of the battery located below the coking chambers and the heating walls and parallel therewith, said regenerators being communicably connected with the flues and operatively disposed into inflow and outflow pairs, the inflow pairs alternating with the outflow pairs on each side of the battery; a producer gas supply; reversing valve connections between said producer gas supply and one regenerator of each pair on both sides of the battery; reversing air valve connections for the other regenerator of each pair on both sides of the battery; waste gas tunnels located respectively on opposite sides of the battery; and valve connections for establishing communication concurrently between the outflow regenerators on each side of the battery respectively with the waste gas tunnels on the same sides of the battery as the regenerators; substantially as specified.

3. In a coke oven battery, in combination: a plurality of coking chambers; heating walls contiguous to such coking chambers and respectively constituted of vertical combustion flues operatively disposed into two groups of consecutive similarly-operable flues; regenerators on both sides of the battery located below the coking chambers and the heating walls and parallel therewith, said regenerators being communicably connected with the flues and operatively disposed into inflow and outflow groups, the inflow groups alternating with the outflow groups on each side of the battery; a producer gas supply; reversing valve connections between said producer gas supply and one regenerator of each group on both sides of the battery; reversing air valve connections for the other regenerator of each group on both sides of the battery; waste gas tunnels; and valve connections for establishing communication concurrently between the outflow regenerators on each side of the battery respectively with said waste gas tunnels; substantially as specified.

4. In a coke oven battery, in combination: a plurality of coking chambers; heating walls contiguous to such coking chambers and respectively constituted of consecutive similarly-operable vertical combustion flues; regenerators located below the coking chambers and the heating walls and parallel therewith, said regenerators being communicably connected with the flues and operatively disposed into inflow and outflow groups, the inflow groups alternating with the outflow groups; a producer gas supply; reversing valve connections between said producer gas supply and one regenerator of each group; reversing air valve connections for the other regenerator of each group; waste gas tunnels located respectively on opposite sides of the battery; and valve connections for establishing communication concurrently between the outflow regenerators respectively with said waste gas tunnels; substantially as specified.

5. In a coke oven battery, in combination: a plurality of coking chambers; heating walls contiguous to such coking chambers and respectively constituted of consecutive similarly-operable vertical combustion flues; regenerators located below the coking chambers and the heating walls and parallel therewith, said regenerators being communicably connected with the flues and operatively disposed into inflow and outflow pairs, the inflow pairs alternating with the outflow pairs; a producer gas supply; reversing valve connections between said producer gas supply and one regenerator of each pair; reversing air valve connections for the other regenerator of each pair; waste gas tunnels located respectively on opposite sides of the battery; and valve connections for establishing communication concurrently between the outflow regenerators respectively with both said waste gas tunnels; substantially as specified.

6. In a coke oven battery, in combination: a plurality of coking chambers; heating walls contiguous to such coking chambers and respectively constituted of vertical combustion flues operatively disposed into two groups of consecutive similarly-operable flues; regenerators on both sides of the battery located below the coking chambers and the heating walls and parallel therewith, said regenerators being communicably connected with the flues and operatively disposed into inflow and outflow groups, the inflow groups alternating with the outflow groups on each side of the battery; waste gas tunnels located respectively on opposite sides of the battery; and valve connections for establishing communication concurrently between the outflow regenerators on each side of the battery respectively with the waste gas tunnels on the same sides of the battery as the regenerators; substantially as specified.

7. In a coke oven battery, in combination: a plurality of coking chambers; heating walls contiguous to such coking chambers and respectively constituted of vertical combustion flues operatively disposed into two groups of consecutive similarly-operable flues; regenerators on both sides of the battery located below the coking chambers and the heating walls and parallel therewith, said regenerators being communicably connected with the flues and operatively disposed into inflow and outflow pairs, the inflow pairs alternating with the outflow pairs on each side of the battery; waste gas tunnels located respectively on opposite sides of the battery; and valve connections for establishing communication concurrently between outflow regenerators on each side of the battery respectively with waste gas tunnels on the same sides of the battery as the regenerators; substantially as specified.

8. A coking retort oven provided with a plurality of coking chambers; heating walls having consecutive similarly-operable flues; inflow and outflow regenerators located on both sides of said oven and communicably connected with the flues, each regenerator being individual to a single heating wall, waste gas tunnels located respectively on opposite sides of said oven; and valve connections for establishing communication concurrently between the outflow regenerators on each side of said oven respectively with the waste gas tunnels on the same sides of the oven as the regenerators; substantially as specified.

9. A coke oven battery provided with a plurality of coking chambers; heating walls having consecutive similarly-operable flues; inflow and outflow regenerators communicably connected with the flues, each regenerator being individual to a single heating wall, the inflow regenerators alternating with the outflow regenerators; waste gas tunnels located respectively on opposite sides of the oven; and valve connections for establishing communication concurrently between the outflow regenerators and both said waste gas tunnels; substantially as specified.

10. A coke oven provided with a plurality of coking chambers, heating walls having consecutive similarly-operable flues, inflow and outflow regenerators communicably connected with the flues, the inflow regenerators being jointly operable for conveying air to the heating walls or separately operable for conveying thereto air and combustible gas, waste gas tunnels located respectively on opposite sides of said oven, and valve connections for establishing communication between the outflow regenerators and both said waste gas tunnels; substantially as specified.

11. A coke oven battery provided with a plurality of coking chambers, heating walls having consecutive similarly-operable flues, air and gas inflow and waste gas outflow regenerators located on both sides of said oven and communicably connected with the flues, and waste gas tunnels also located on both sides of said oven and communicably connectable concurrently with all the outflow regenerators; substantially as specified.

12. A coke oven battery provided with a plurality of coking chambers, heating walls having consecutive similarly-operable flues, inflow and outflow regenerators located on both sides of said oven and communicably connected with the flues, each regenerator being individual to a single heating wall, and waste gas tunnels also located on both sides of said oven and communicably connectable concurrently with all the outflow regenerators; substantially as specified.

In testimony whereof, I have hereunto set my hand.

JOSEPH BECKER.